Oct. 25, 1949. E. W. BATTERSON 2,486,098
CONTROL LOCK MECHANISM
Filed Sept. 20, 1945
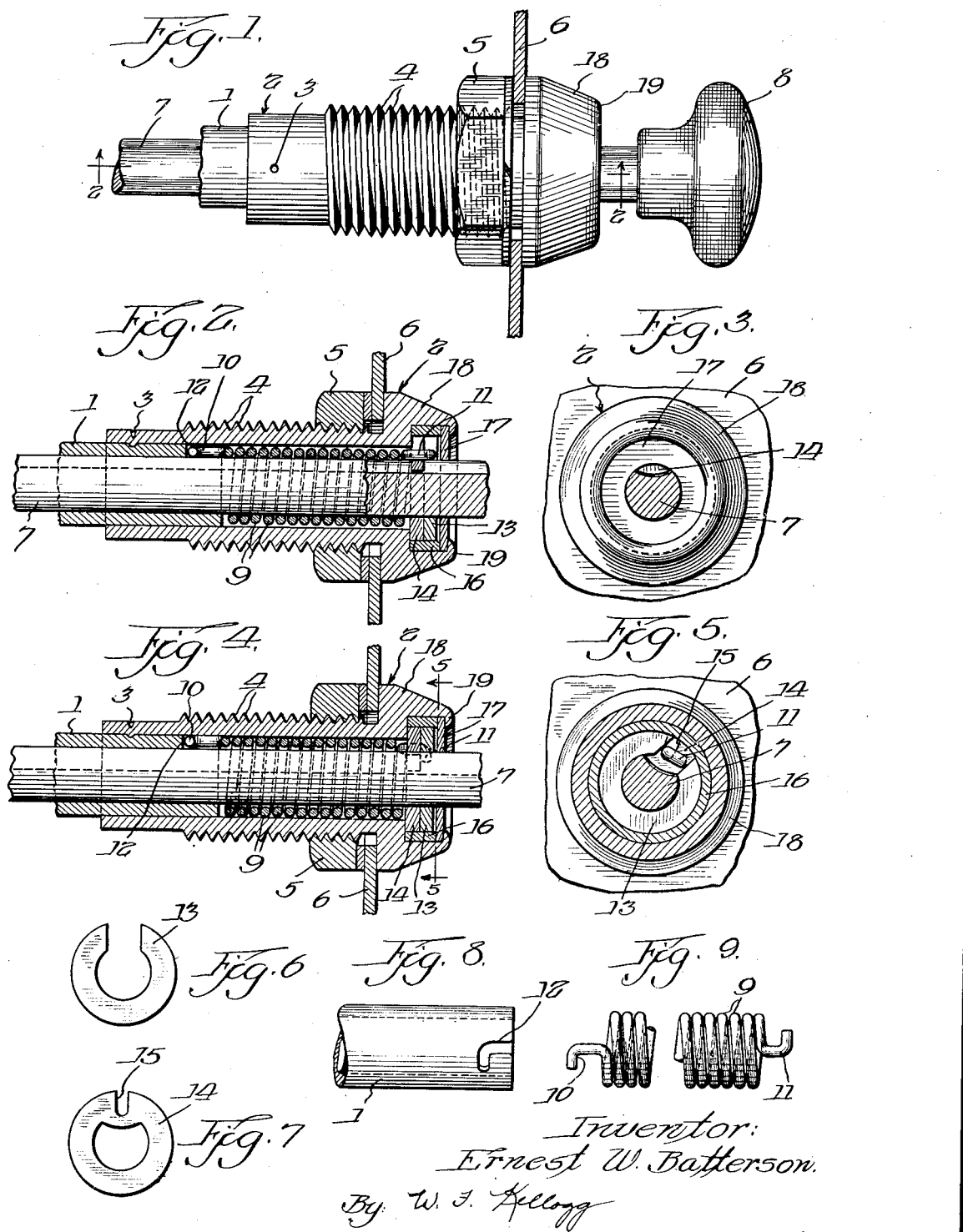
Inventor:
Ernest W. Batterson.
By W. J. Kellogg
Atty Patented Oct. 25, 1949

2,486,098

UNITED STATES PATENT OFFICE 2,486,098

CONTROL LOCK MECHANISM

Ernest W. Batterson, Kalamazoo, Mich., assignor to Shakespeare Products Company, Kalamazoo, Mich., a corporation of Michigan Application September 20, 1945, Serial No. 617,524

1 Claim. (Cl. 74—503)

This invention relates to improvements in control devices of the push-pull type, having for an object to provide a device whereby push or pull control motion may be selectively transmitted to various kinds of apparatus or devices equipped with the same and will thereby be operationally controlled.

It is an equally important object of the invention to provide a control device in which the push-pull control motion transmitting member thereof will be automatically locked and securely retained in a particularly adjusted position and, when desired, can be instantly unlocked or released to permit other and desirable push or pull motion transmission.

Furthermore, it is an object of the invention to provide a control device of the indicated character, wherein the control motion transmitting means supplied thereto is capable of minute push and pull sliding adjustment and, most important, substantially instantaneously locked in an adjusted position.

Moreover, it is an object of the invention to provide a control device having a novel and efficient form of locking means for releasably securing its control or motion transmitting rod in any one of adjusted positions without the use of teeth, pawls, screw threads, etc., upon or operatively associated with the same, and which will be of durable, dependable and simple construction.

Other objects of the invention will be in part obvious and in part pointed out hereinafter.

In order that the invention and its mode of operation may be readily understood by those skilled in the art to which it appertains, I have, in the accompanying drawings and the detailed description based thereupon, set out one embodiment of my invention.

In the drawings:

Figure 1 is a side elevation of the improved device with the control rod (push-pull rod) fragmentally shown.

Figure 2 is a longitudinal section taken on the line 2—2 of Figure 1, looking in the direction in which the arrows point, and wherein the locking spring is in engaged relationship with respect to the control rod.

Figure 3 is an end elevation of the construction shown in Figure 2.

Figure 4 is a view similar to Figure 2, but wherein the locking spring is shown in its disengaged or expanded position with relation to the control rod.

Figure 5 is a transverse section taken on the line 5—5 of Figure 4, looking in the direction in which the arrows point.

Figure 6 is an elevation of the type of spacer washer employed by the device.

Figure 7 is an elevation of the broached washer employed by the device for connecting one end of the locking spring to the control rod.

Figure 8 is a fragmentary elevation of one end portion of the body tube of the device, and Figure 9 is a detail in elevation of the locking spring having an intermediate portion thereof broken away.

Referring in detail to the drawings, the improved control comprises a tubular body 1 and a tubular face plate assembly, generally identified by the numeral 2, staked together, as indicated at 3, or otherwise suitably interconnected; the tubular portion of the face plate assembly being peripherally screw threaded, as at 4, to facilitate the engagement of a locking nut 5 in clamping relationship to a panel 6 or other supporting body, as shown in Figures 1 and 2 of the drawings.

The face or forward portion of the assembly 2 is annularly recessed or chambered, for a purpose which will be hereinafter described.

Slidably received through the body tube 1 and the face plate assembly 2 and extending beyond the same, is a longitudinally grooved extruded control rod 7, the normally forward end of which is provided with a suitable type of knob or handle 8, while its opposite end is connected to suitable motion transmitting means (not shown) having connection with an apparatus or a device to be controlled. A coiled spring 9 is engaged about and over an intermediate part of the control rod 7, and is arranged or housed within the intermediate portion of the face plate assembly 2, as will be seen upon reference to Figures 2 and 4 of the accompanying drawings. Said spring 9 is coiled with an inside diameter slightly smaller than the outside diameter of the control rod 7 and has oppositely disposed loops 10 and 11 formed on its opposite ends.

That end portion of the body tube 1 telescopically received within and connected to the adjacent end portion of the face assembly 2 (each of which is non-rotatable by reason of the clamp or other similar mounting of the face plate assembly 2, in the manner above indicated) is provided with a right angularly formed inwardly extending notch 12 into which the adjacent and correspondingly formed loop 10 of the coiled spring 9 is engaged.

Loosely received within the annular chamber or recess of the face plate assembly 2 is a slotted spacer washer 13, while bearing upon or engaged with its inner face is a broached washer 14, which fits snugly (though allowing a sliding fit) over and about the longitudinally grooved control rod 7.

The remaining looped end 11 of the coiled spring 9 is engaged through an appropriate slot 15 formed in the broached washer 14 and through the slotted spacer washer 13, thus effecting connection between said end of the spring 9 and the control rod 7.

The outwardly opening annular chamber in the face plate assembly 2 is provided with a suitable tubular or sleeve-like spacer 16 receiving the aforesaid washers 13 and 14, and an appearance or facing washer 17 which, as will be noted upon reference to Figures 2 and 4 of the drawings, has bearing upon the adjacent marginal portion of the tubular spacer 16 and is securely retained in assembled relation by spinning over the adjacent portion of the face plate 18, as at 19.

In usage of the improved control device, it will be understood that following sliding (push or pull) adjustment of the control rod 7 to any predetermined position throughout its path of travel limitations, the coiled spring 9, having an inside diameter slightly smaller than the outside diameter of said rod, exerts an inward pressure on the rod, hence, rendering it impossible for the same to slide in either direction with relation to the spring. To release or unlock the control rod, the knob 8 is rotated slightly in a direction to cause an unwinding or expansion of the spring 9 uniformly throughout its length. Such unwinding rotation effects full disengagement of the spring from and the release of its previously applied inward pressure on the control rod 7, making it possible to slidably move the rod in a control operation— either by push or pull motion.

The referred to unwinding or expansion of the spring 9, it will be understood, is accomplished because one end of said spring is held in a substantially fixed position relative to the body tube 1 and the face plate assembly 2, whereas its opposite end is engaged with the broached washer 14 slidable on the longitudinally grooved control rod 7 and rotatable coincidentally therewith.

Following partial rotation of the control rod 7, through its knob 8, in a direction to effect the described unwinding or expansion of the coiled spring 9, and the sliding (push or pull) adjustment of said rod in a control motion transmitting operation, the knob is released by the operator. Thereupon, the spring 9 instantly returns to its normal or initial contracted position, hence, applying locking pressure to and along the control rod 7, locking it against further or undesired sliding movement in either direction. That is to say, the torque of the spring 9 holds the control rod 7 constantly in a locked position and such vibration as may be transmitted thereto, serves only to more positively lock or secure it. Actual usage tests of the improved control device show that with a spring made of wire of .045 diameter and a body length of approximately one and one-fourth (1¼) inches, there has been achieved a lacking of the control rod sufficiently strong to resist a one hundred pound thrust in either direction along its path of normal movement.

It will be understood and appreciated by workers skilled in this art that a material and highly important advantage is provided by the improved control device in that the control rod member thereof can be locked at any point throughout its normal path of sliding movement, inasmuch as no teeth or other serrations are included in its construction and/or design.

Control devices whose control rods or their equivalents are provided with teeth, serrations, deformed parts, etc., require an operational movement which is, generally, in the neighborhood of 90°. In the improved device, a 30° rotational movement of the control rod 7 is quite sufficient to effect an "unlocking" of the device, i. e., an unwinding or expansion of the coiled spring 9 to an extent sufficient to effect the release of its normal contractile pressure from and along the control rod 7.

While I have herein illustrated and described, with some degree of particularity, certain characters or forms of construction and operation members in connection with which my improved locking device is employed, it is to be understood that such constructional members may be varied, altered or modified, such as conditions or preference may dictate, without departing from the ambit or spirit of the invention, the essence of which is presented in and by the hereinbefore described spring locking device and its mode of connection to the structural parts of a control device equipped therewith.

I claim:

In a control device, a facing plate assembly, including a tubular body portion, the facing plate having an outwardly opening chamber therein of greater size than the internal cross-sectional area of the tubular body portion communicating with said tubular body portion, a spacer sleeve in said chamber adjacent its side walls, a longitudinally grooved rod slidably and rotatably received in the tubular body portion and extended into said chamber and through said spacer sleeve, a coiled spring within the tubular body portion engaged about an adjacent portion of said rod, a connecting washer slidably received in said spacer sleeve in said facing plate chamber rotatably and slidably engaged with and along the longitudinally grooved rod, one end of the coiled spring being connected to the tubular body portion and its remaining end connected to said connecting washer, and closure means engaged in the open end of said facing plate chamber retaining said spacer sleeve and connecting washer in the chamber.

ERNEST W. BATTERSON.

REFERENCES CITED

The following references are of record in the file of this patent:

UNITED STATES PATENTS

| Number | Name | Date |
|---|---|---|
| 1,550,969 | Landis | Aug. 25, 1925 |
| 2,309,636 | Fergueson | Feb. 2, 1943 |
| 2,429,383 | Arens | Oct. 21, 1947 |

FOREIGN PATENTS

| Number | Country | Date |
|---|---|---|
| 755,967 | France | July 2, 1934 |
| 749,944 | France | May 15, 1933 |
| 837,156 | France | Nov. 3, 1938 |